US010079674B2

(12) United States Patent
Maniatakos et al.

(10) Patent No.: US 10,079,674 B2
(45) Date of Patent: Sep. 18, 2018

(54) SYSTEMS AND METHODS FOR PRIVACY-PRESERVING FUNCTIONAL IP VERIFICATION UTILIZING FULLY HOMOMORPHIC ENCRYPTION

(71) Applicant: New York University, New York, NY (US)

(72) Inventors: Michail Maniatakos, Abu Dhabi (AE); Charalambos Konstantinou, New York, NY (US); Anastasis Keliris, New York, NY (US)

(73) Assignee: NEW YORK UNIVERSITY, New York, NY (US)

(*) Notice: Subject to any disclaimer, the term of this patent is extended or adjusted under 35 U.S.C. 154(b) by 264 days.

(21) Appl. No.: 15/051,278

(22) Filed: Feb. 23, 2016

(65) Prior Publication Data

US 2016/0254912 A1 Sep. 1, 2016

Related U.S. Application Data

(60) Provisional application No. 62/121,409, filed on Feb. 26, 2015.

(51) Int. Cl.
*H04L 9/32* (2006.01)
*H04L 9/00* (2006.01)

(52) U.S. Cl.
CPC .............. *H04L 9/008* (2013.01); *H04L 9/321* (2013.01); *H04L 2209/08* (2013.01); *H04L 2209/46* (2013.01)

(58) Field of Classification Search
CPC ..... H04L 9/008; H04L 9/321; H04L 2209/46; H04L 2209/08
USPC ......................................................... 713/168
See application file for complete search history.

(56) References Cited

U.S. PATENT DOCUMENTS

| 5,699,427 | A | * | 12/1997 | Chow | ............. | G11B 20/00086 380/202 |
|---|---|---|---|---|---|---|
| 8,316,237 | B1 | * | 11/2012 | Felsher | ................. | H04L 9/0825 380/282 |
| 8,904,181 | B1 | * | 12/2014 | Felsher | ................. | H04L 9/0825 380/282 |
| 9,419,951 | B1 | * | 8/2016 | Felsher | ................. | H04L 9/0825 |
| 2008/0304657 | A1 | * | 12/2008 | Tuyls | ..................... | H04L 9/008 380/28 |

* cited by examiner

*Primary Examiner* — Teshome Hailu
(74) *Attorney, Agent, or Firm* — Foley & Lardner LLP

(57) ABSTRACT

A privacy-preserving verification methodology for SoC computing systems is described. The verification methodology utilizes the principles of Multi-Party Computation ("MPC"), and enables meaningful manipulation of encrypted data in the encrypted domain through the use of a fully homomorphic encryption ("FHE") scheme. In the described verification methodology, IP logic is transformed and test vectors utilized to verify the IP logic are encrypted. The parties involved in the verification (e.g., the designer, the manufacturer, a third-party verification service, etc.) can functionally verify the IP core via the encrypted test vectors while the encrypted test vectors remain in the encrypted domain. Accordingly, the IP core is verified without revealing unwarranted information, such as the underlying IP behind the SoC.

19 Claims, 6 Drawing Sheets

Circuit Transformation Operations

| Operation | Transformation |
|---|---|
| $A \oplus B$ | $A \oplus B$ |
| $A \wedge B$ | $A \wedge B$ |
| $\neg A$ | $A \oplus 1$ |
| $A \vee B$ | $((A \oplus 1) \wedge (B \oplus 1)) \oplus 1$ |
| $A \bar{\wedge} B$ | $(A \wedge B) \oplus 1$ |
| $A \bar{\vee} B$ | $((A \oplus 1) \wedge (B \oplus 1) \oplus 1) \oplus 1$ |
| $\neg(A \oplus B)$ | $(A \oplus B) \oplus 1$ |
| $\neg(A \wedge (B \vee C))$ | $(((A \wedge B) \oplus 1) \wedge (C \oplus 1)) \oplus 1$ |
| $\neg((A \vee B) \wedge C)$ | $((((A \oplus 1) \wedge (B \oplus 1)) \oplus 1) \wedge C) \oplus 1$ |
| MUX2 | $(((A \wedge S) \oplus 1) \wedge (((S \oplus 1) \wedge B) \oplus 1)) \oplus 1$ |
| FA | $(A \oplus B) \oplus C$ |
| FA($C_{out}$) | $((((A \oplus B) \wedge C) \oplus 1) \wedge ((A \wedge B) \oplus 1)) \oplus 1$ |
| HA | $A \oplus B$ |
| HA($C_{out}$) | $A \wedge B$ |

Security Parameters Overheads Normalized to 384/8/5 Key Geometry

| Key geometry ($\lambda$/S1/S2) | N | $\mu$ | d | Keygen | Exectime | Recrypt |
|---|---|---|---|---|---|---|
| 384/8/5 | 8 | 4 | 7 | 1 | 1 | 1 |
| 384/16/5 | 8 | 4 | 7 | 0.1 | 2.0 | 2.0 |
| 384/16/5 | 8 | 6 | 7 | 1.8 | 1.7 | 1.7 |
| 384/64/16 | 8 | 4 | 7 | 0.3 | 10.0 | 10.0 |
| 512/64/16 | 8 | 4 | 7 | 5.7 | 11.8 | 11.8 |
| 1024/64/16 | 8 | 4 | 8 | 70.7 | 15.3 | 15.4 |
| 2048/16/5 | 4 | 2 | 10 | 124.2 | 1.9 | 1.9 |
| 4096/16/5 | 4 | 2 | 11 | 830.6 | 2.8 | 2.8 |

FIG. 4

Synthesis Optimization Results

| Circuit | $XA^+IO$ (%) | $XA^+IO^+$ (%) | $XA^+IO^+N$ (%) |
|---|---|---|---|
| c432 | 77.66 | 7.85 | -53.99 |
| c499 | 63.89 | -37.18 | -34.92 |
| c880 | 82.52 | -4.20 | -46.27 |
| c1355 | 48.22 | 70.88 | -43.77 |
| c1908 | 36.41 | -21.71 | -50.79 |
| c2670 | 73.41 | 3.07 | -39.30 |
| c3540 | 73.84 | -5.04 | -37.22 |
| c5315 | 71.17 | -13.98 | -31.08 |
| c6288 | 70.37 | 0.73 | -30.41 |
| c7552 | 37.63 | -25.03 | -41.12 |
| s344 | 113.7 | -4.00 | -42.47 |
| s400 | 76.58 | -42.61 | -51.65 |
| s713 | 149.23 | -21.48 | -31.95 |
| s820 | 78.16 | -10.72 | -49.13 |
| s838 | 74.12 | -24.45 | -50.74 |
| s1196 | 71.81 | -0.21 | -41.44 |
| s1488 | 80.11 | -3.19 | -38.01 |
| s13207 | 62.32 | -19.20 | -37.72 |
| s35932 | 74.28 | -23.91 | -37.60 |
| s38584 | 64.13 | -14.93 | -34.32 |
| Average | 73.98 | -9.47 | -41.2 |

FIG. 5

SYSTEMS AND METHODS FOR PRIVACY-PRESERVING FUNCTIONAL IP VERIFICATION UTILIZING FULLY HOMOMORPHIC ENCRYPTION

CROSS-REFERENCE TO RELATED PATENT APPLICATIONS

This application claims priority from Provisional Application U.S. Application 62/121,409, filed Feb. 26, 2015, incorporated herein by reference in its entirety.

BACKGROUND

System on Chip ("SoC") computing solutions have progressively become a very attractive option for meeting the design requirements imposed by computing customers, while maintaining a low time-to-market development timeline. For example, SoC computing solutions are often utilized in the integrated circuit ("IC") market. As the IC market continues to expand, so do the number of vendors utilized in the development and manufacturing of SoC computing solutions and the number of end users. As such, exposure of intellectual property ("IP") used in the development to these vendors and used in the end-products used by the users also increases. The vendors and users may be located around the world, potentially resulting in global exposure of the underlying IP utilized in the SoC computing solutions.

The globalized nature of the SoC market enables an ecosystem consisting of both trusted and untrusted IP owners and users, as well as legitimate and malicious users. IP theft accounts for approximately 62% of cybercrime damages, while many analysts concur that the extent of IP stolen in reality cannot be currently measured with confidence. IP reverse engineering by malicious and untrusted users has also emerged as a major concern for IP owners, as adversaries possess increasingly sophisticated tools for revealing the IP of a given SoC, such as design secrets and manufacturing methods.

A prominent phase in the SoC design cycle that requires close collaboration between the IP vendor and the IP user, is the verification of the core of the SoC. Verification tools vary from simple implementations that target specific types of processors, to methodologies that can be applied to mixed software and hardware descriptions (e.g., System C verification). While recent work has focused on advanced verification methods, such as model checking and equivalence checking, verification using simulation methods still remains the preferred method to verify that a produced SoC is produced in accordance with the IP of the SoC designer. Such a verification typically requires the exposure of the IP by the SoC designer, which may result in IP misappropriation by the vendor or the end user.

SUMMARY

One embodiment relates to a method of verifying an intellectual property ("IP") core with test vectors in the encrypted domain between at least two parties. The at least two parties include an IP owner and an IP user. The method includes transforming, by an IP owner computing system, an IP core to a fully homomorphic encryption ("FHE") compatible netlist. The method further includes generating, by an IP user computing system, a private encryption key and a public encryption key for a FHE scheme. The method includes encrypting, by the IP user computing system, a test vector with the private encryption key to form an encrypted test vector that is encrypted according to the FHE scheme. The method further includes inputting the FHE compatible netlist, the encrypted test vector, and the public encryption key into a privacy-preserving verification ("PPV") tool. The method includes generating, by the PPV tool, an encrypted test output. The method further includes transmitting the encrypted test output to the IP user computing system.

Another embodiment relates to a computer implemented system having a processor; and a tangible computer-readable medium operatively connected to the processor. The tangible computer-readable medium includes computer code configured to: transform, by an IP owner computing system, an IP core to a fully homomorphic encryption ("FHE") compatible netlist; generate, by an IP user computing system, a private encryption key and a public encryption key for a FHE scheme; encrypt, by the IP user computing system, a test vector with the private encryption key to form an encrypted test vector that is encrypted according to the FHE scheme; input the FHE compatible netlist, the encrypted test vector, and the public encryption key into a privacy-preserving verification ("PPV") tool; generate, by the PPV tool, an encrypted test output; and transmit the encrypted test output to the IP user computing system.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 2 is a table showing the transformation of cells of a typical library to a combination of XOR and AND gates according to an exemplary embodiment.

FIG. 4 is a table that summarizes the key generation, execution time, and recrypt figures for different security parameters to the encryption library is shown according to an exemplary embodiment.

FIG. 5 is a table comparing three different cases for synthesis-driven optimizations according to an exemplary embodiment.

DETAILED DESCRIPTION

Figure 1:
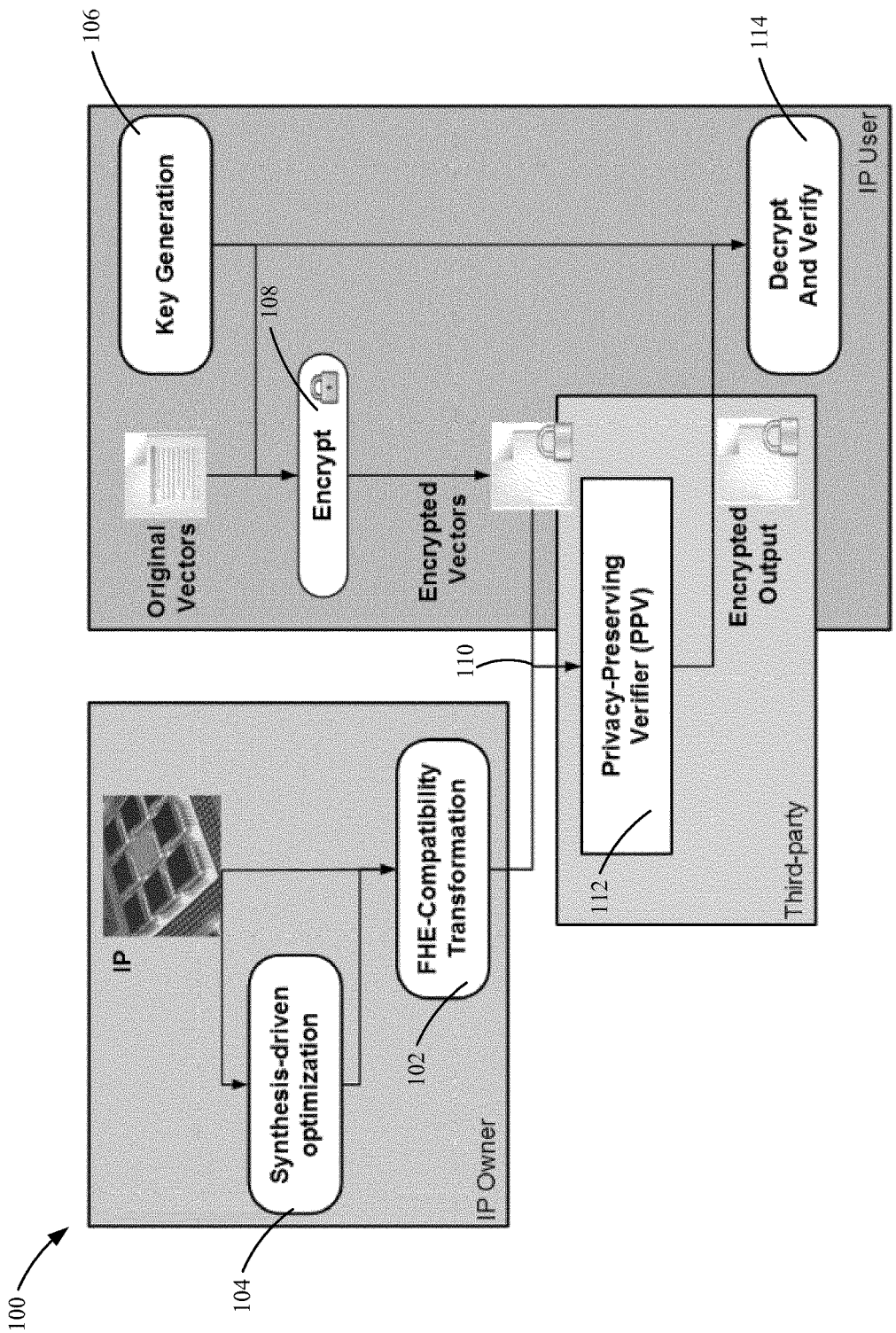
FIG. 1 is a flow diagram of a method of utilizing a privacy-preserving verification protocol according to an exemplary embodiment.

Referring generally to the figures, a privacy-preserving verification methodology for SoC computing systems is described. The verification methodology utilizes the principles of Multi-Party Computation ("MPC"), and enables meaningful manipulation of encrypted data in the encrypted domain through the use of a FHE scheme. In the described verification methodology, IP logic is transformed and test vectors utilized to verify the IP logic are encrypted. The parties involved in the verification (e.g., the designer, the manufacturer, a third-party verification service, etc.) can functionally verify the IP core via the encrypted test vectors while the encrypted test vectors remain in the encrypted domain. Accordingly, the IP core is verified without revealing unwarranted information, such as the underlying IP behind the SoC.

The FHE and MPC Schemes

A FHE scheme allows for meaningful computation on encrypted data in the encrypted domain. In other words, by employing a FHE scheme, data does not first need to be decrypted ahead of manipulation and later re-encrypted after the data manipulation is complete. A detailed description of the FHE scheme is found in "A Fully Homomorphic Encryption Scheme," by C. Gentry, Ph.D., published on September 2009, herein incorporated by reference. Another detailed description of the FHE scheme is found in U.S. Pat. No. 8,630,422, entitled "FULLY HOMOMORPHIC ENCRYPTION METHOD BASED ON A BOOTSTRAPPABLE ENCRYPTION SCHEME, COMPUTER PROGRAM AND APPARATUS," by Gentry, dated Jan. 14, 2014, which is herein incorporated by reference in its entirety and for all purposes. Initial homomorphic encryption schemes were cost prohibitive because the homomorphic encryption schemes were complex and required substantial computing processing power for data manipulation in the encrypted domain. However, advances in computing capabilities and the introduction of newer, FHE schemes have decreased the originally prohibitive computational costs associated with computing with FHE.

FHE enables operations on encrypted data (i.e., ciphertext) without the knowledge of the encryption key (i.e., without having to first decrypt the encrypted data). For example, equations for homomorphic addition and homomorphic multiplication are shown below in Equations 1 and 2, respectively, where function E represents an FHE encryption operation.

$$E(y_1)+E(y_2)=E(y_1+y_2) \quad (1)$$

$$E(y_1)*E(y_2)=E(y_1 \otimes y_2) \quad (2)$$

The utilized FHE scheme includes the basic four FHE algorithms: Keygen, Encrypt, Decrypt, and Eval. The Eval algorithm is built based on three other algorithms: Add, Mult, and Recrypt. Eval takes as input a circuit ("C"), a public key ("pk"), encryptions of $\epsilon_1, \ldots, \epsilon_n$ and evaluates $C(\epsilon_1, \ldots, \epsilon_n)$ using only $\epsilon_i$'s ciphertexts. This concept of Multikey-FHE can evaluate any encrypted circuit C using different keys, and consequently can be used to construct MPC protocols. The Recrypt operation "cleans" the ciphertext from the noise due to the homomorphic addition and multiplication operations. Without the cleaning function of the Recrypt, the FHE scheme would only be somewhat homomorphic, and therefore, it would only evaluate circuits of a fixed depth.

The theoretical background of the FHE scheme and the key generator used in the FHE scheme is based on the Smart-Vercauteren method. The Smart-Vercauteren method is described in further detail in "On-the-fly multiparty computation on the cloud via multikey fully homomorphic encryption," by A. Lopez-Alt, E. Tromer, and V. Vaikuntanathan published in the STOC'12 Proceedings of the fourth-fourth annual ACM symposium on Theory of Computing, pgs. 1219-1234, hereby incorporated by reference. The parameter $\lambda$ defines the cipher size and is the upper bound $\mu$ for picking a random polynomial in the key generator. The public key contains a decryption hint that is split into $S_2$ addends and randomly distributed over an array of size $S_1$. In some arrangements, N is the degree of any monic irreducible polynomial F(x). In such arrangements, the monic irreducible polynomial for the key generation is shown below in Equation 3.

$$F(x)=x^N+1 \quad (3)$$

For the aforementioned parameters, certain experimental results are discussed below (in the section bearing heading "Experimental Results") that detail the trade-off between the security level of the implementation and the overall verification time.

As described in further detail below, using FHE, the trust issues imposed by the collaboration of the IP designer and the IP user are resolved. The implemented MPC protocol essentially allows for all parties to securely and jointly perform any computation over their inputs with zero knowledge of the unencrypted test vectors and the non-obfuscated underlying IP.

Privacy-Preserving Verification Protocol

In the target usage model, privacy-preserving IP verification includes either (1) two parties (i.e., the IP owner and the IP user), or (2) three parties (i.e., the IP owner, the IP user, and a third-party service provider utilized for verification outsourcing). The proposed methodology is flexible enough to support all different usage models in the context of MPC. In all scenarios, the IP owner seeks to obscure implementation details of the IP core, while the IP user aims to protect potentially proprietary test vectors formed via a SoC utilizing the IP core.

Referring to FIG. 1, a flow diagram of a method 100 utilizing the above-described privacy-preserving verification protocol is shown according to an exemplary embodiment. The method 100 utilizes the privacy-preserving verification protocol to perform design verification using FHE. Method 100 may be performed by processors of various computing systems, such as an IP owner computing system, an IP user computing system, and a third-party verification service computing system. Each of the computing systems may communicate data to and from the other computing systems via a network, such as the Internet. Method 100 is described in further detail below.

Method 100 begins when the IP owner transforms the IP to a 'FHE-compatible' netlist at 102. In some arrangements, the transformation includes a re-synthesis step at 104 to increase system performance. As discussed above, the FHE domain supports homomorphic addition and homomorphic multiplication, which correspond to XOR and AND functions respectively. Therefore, in order to use the IP core in the proposed PPV, all combinational logic is transformed to corresponding XOR and AND gates, creating an FHE-compatible netlist. Sequential logic (e.g., flip-flops, latches etc.) intuitively remain as is. Referring to FIG. 2, a table 200 showing the transformation of cells of a typical library to a combination of XOR and AND gates is shown according to an exemplary embodiment. The library contains only 2-input gates. Gates with more than two inputs can be transformed to a series of 2-input gates. Several of the transformations include fixed values as one of the inputs; therefore, the developed PPV tool maintains a pool of encrypted fixed values to be used during verification.

With regards to special inputs, such as the clock and reset signals, the IP user can choose to use their unencrypted versions, which avoids the extra overhead of encrypting a large set of '0' and '1'. This cannot be applied, however, to designs that incorporate clock gating mechanisms, as unencrypted signals cannot be mixed with encrypted signals.

While in a typical IP verification environment the AND and XOR operations have comparable performance overheads, the FHE domain introduces substantial time differences. Specifically, the AND operation adds more performance overhead compared to the XOR operation, for the following two reasons. First, homomorphic multiplication is by default slower than homomorphic addition, similar to the performance difference between integer multiplication and integer addition. Second, homomorphic multiplication introduces more noise per operation compared to homomorphic addition. In other words, a series of homomorphic multiplications can render a ciphertext indecipherable much faster than a series of homomorphic additions. Noise is reduced using the recrypt function (e.g., as explained above). Thus, homomorphic multiplications require more computationally intensive recrypt operations.

The recrypt algorithm performs a refresh on an encryption of the ciphertext bits using information contained in the public key. As a result, the overhead of producing a cleaner cipher-text (e.g., a cipher-text with less noise) is considerably high compared with the encrypt and decrypt functions. An AND operation, i.e. a multiplication, inherits the sum of the two operands' noises and therefore must be used along the recrypt function when the dirtiness (i.e., noise) of the circuit becomes greater than the depth of the circuit. In order to identify the cumulative noise of the ciphertexts, the noise of every encrypted bit is measured. XORs, practically, do not require the recrypt operation because XOR adds considerably less noise to the output operand compared to the AND function. In more detail, the ratio in terms of noise added to output operand after an AND operation and an XOR operation was experimentally found to be 20:1.

In order to minimize the performance overhead of an IP core, the synthesis tool used to implement the re-synthesis operation is driven to remove as many multiplication operations as possible. To this end, a three-step process is required. First all but XOR and AND gates are removed from the target library. Second, the AND gate area size is modified to be substantially higher than the XOR gate area size. Third, the circuit is synthesized and optimized for area. Experimental results that corroborate that synthesis-driven optimization can improve the performance of PPV by up to 41.2% are discussed in further detail below (beneath the Experimental Results heading).

Referring again to FIG. 1, method 100 continues when the IP user generates the private and public encryption keys at 106, and encrypts the input vectors using the FHE scheme at 108. On the IP user's side, the first step is to generate the FHE key pair to be used for encrypting/decrypting the test inputs patterns. The size of the keys and the selected security parameters offer a trade-off between security and performance, as analyzed in the experimental results (discussed below). The default security parameters the PPV tool uses are $\lambda=348$, $S_1=8$, $S_2=5$, $N=8$ and $\mu=4$. Every bit of every test vector is encrypted using the generated private key. Every encryption includes a random factor as well, in order to generate different encrypted representations for all '0' and '1'. As previously discussed, the IP user can opt-out of clock and reset signals encryption. The encrypted input patterns are then securely transmitted to the third-party, which will run the PPV tool.

Method 100 continues when the outputs of the previous steps (IP Core+Encrypted Test Vectors) are securely transmitted to a third-party verification service at 110. The third-party uses the developed Privacy-Preserving Verification ("PPV") tool, which is discussed in further detail below (III-C), and generates the encrypted test outputs at 112. In two-party arrangements (i.e., where no third-party verification service is used), the PPV tool can be used by either the IP owner or the IP user, instead of a third-party. The heart of the PPV tool is a functional simulator, modified to perform homomorphic operations instead of typical Boolean logic manipulation. The PPV tool receives two inputs: (1) The FHE-compatible IP netlist, and (2) the encrypted input vectors. The PPV tool then proceeds to functionally simulate the design. In case the clock and reset signals are unencrypted, the PPV tool initiates reset and clocking mechanisms. A major difference between FHE-compatible and typical functional simulation is that all gates are evaluated, even if the output value does not change, due to probabilistic encryption. For example, in typical simulation, when an AND gate has an output of 0, and a logic 0 arrives at the input, the output value does not need to be evaluated and no value change propagation is necessary. However, in the encrypted domain, the PPV tool does not differentiate between 0 and 1, so the output needs to be evaluated and propagated every time.

Method 100 continues when the encrypted test outputs are transmitted back to the IP user, and they are decrypted using the IP user's private key at 114. The IP user compares the decrypted test output with the expected test output and verifies the functionality of the IP core.

Experimental Results

In this section, the proposed methodology is evaluated and the performance implications of the proposed privacy-preserving IP verification are discussed in further detail below.

Figure 3:
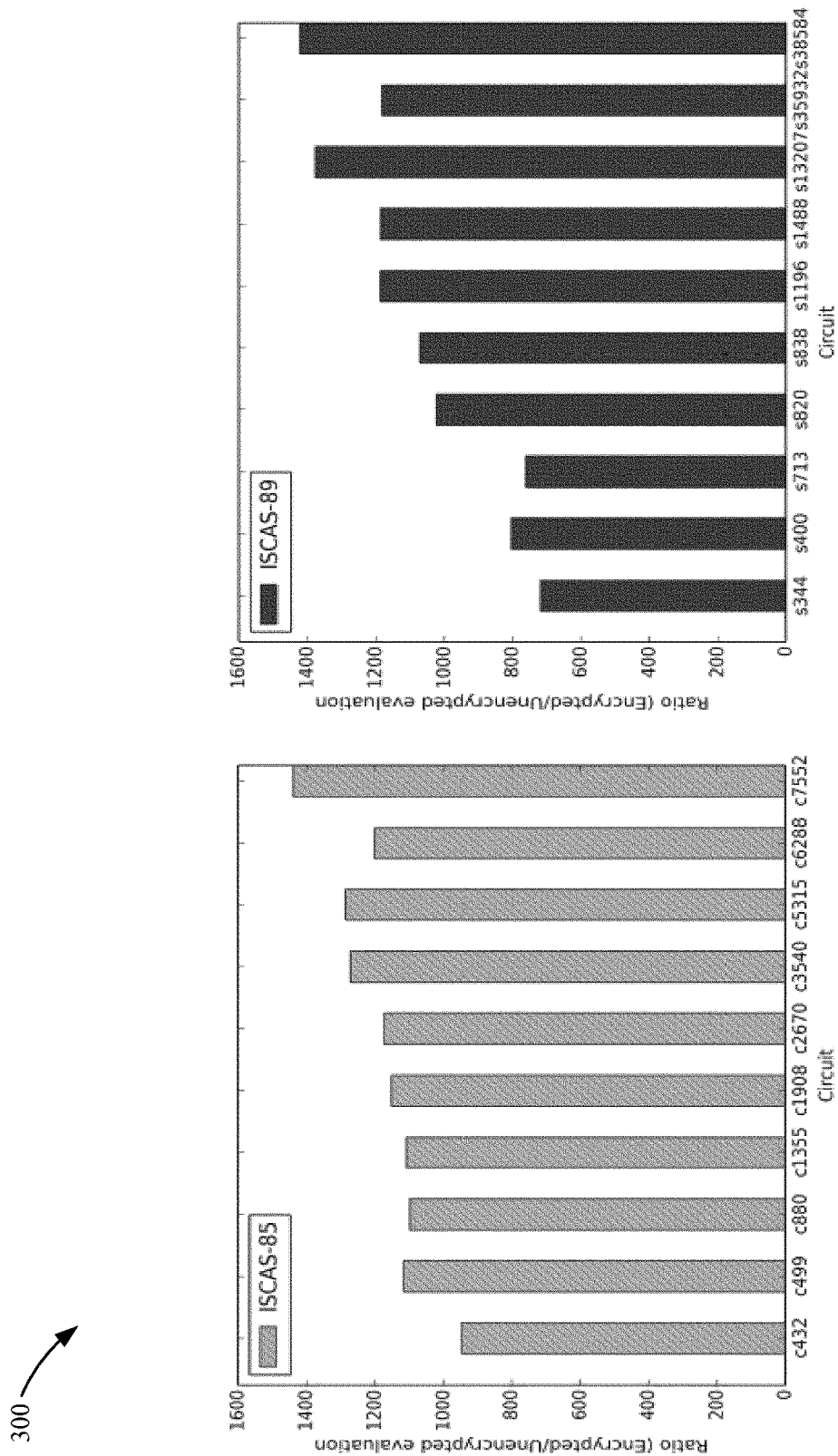
FIG. 3 shows graphs demonstrating the IP verification slowdown for a series of ISCAS benchmarks, using the table of FIG. 2 to convert the various gates to FHE operations and random input patterns.
Figure 6:
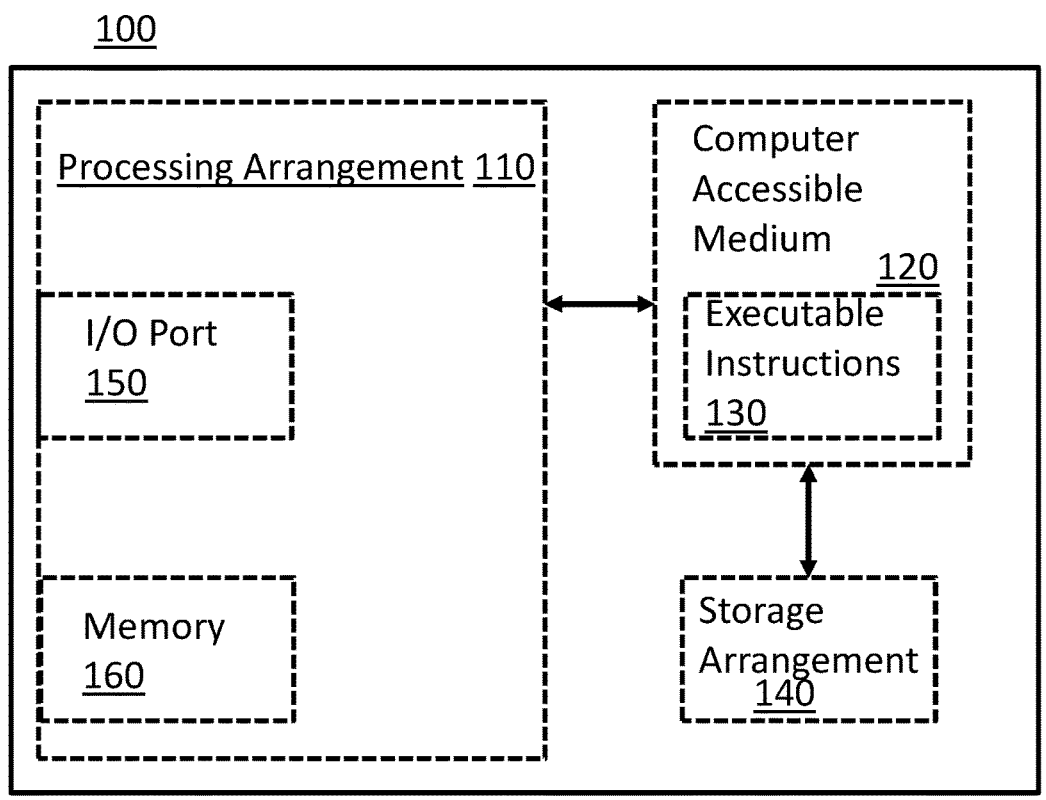
FIG. 6 illustrates a computer system for use with certain implementations.

Performance overhead of encrypted test vectors: The first set of results demonstrate the performance overhead of the developed methodology. Referring to FIG. 3, graphs 300 showing the IP verification slowdown for a series of ISCAS benchmarks, using table 200 of FIG. 2 to convert the various gates to FHE operations and random input patterns. The overhead ranges from 700×, for the smaller circuits, up to 1400× for the larger designs, demonstrating a correlation between the size of the circuit and the overhead of the privacy-preserving verification methodology.

Effect of security parameter trade-offs: The second set of results reveal the effect of the desired security constraints to the proposed methodology. Referring to FIG. 4, a table 400 that summarizes the key generation, execution time, and recrypt figures for different security parameters is shown according to an exemplary embodiment. The goal of the experiments was to present the correlation between different security and timing factors. Table 400 summarizes, for a single circuit, the effect on the overall execution time, as well as the required depth d for performing the recrypt function, of various security parameters. The results presented in table 400 are normalized to the overhead of the default configuration our tool uses.

As shown in FIG. 4, as both $S_1$ and $S_2$ increase, the time needed for the recrypt, and therefore the execution algorithm increases. This arises from the fact that the re-encryption algorithm takes as public key the result of the extended keygen algorithm $PK=(p, \alpha, S_1, S_2, \{c_i, B_i\}_{i=1}^{S_i})$. In addition, table 400 shows that the most time-consuming function is the key-generation algorithm, which is directly dependent on the security parameter $\lambda$ of the implementation. Large values of $\lambda$ increase the key generation time as well as the security level of the design. As key generation happens only once, however, this overhead becomes less important as the execution time dominates.

Furthermore, the degree of $F(x)$ used for the key generation, N, also determines the required depth for the recrypt algorithm. The latter has a greater effect on N's value compared to the parameter $\mu$. It should be also noted that the case of μ=2 is chosen in order to obtain as large a depth for the somewhat HE as possible. Summarizing, as the values of λ, $S_1$, and $S_2$ increase, the time needed for calculating the key and using re-encryption increases. With regards to the parameters N and μ, although they affect the overall timings, their major contribution is related to the cumulative noise of ciphertexts and therefore how often the recrypt operation is triggered.

System-Driven Optimization

The circuits' original netlist is transformed to an FHE-friendly netlist, as discussed above. Three different cases for synthesis-driven optimization are introduced, and the results are compared to the baseline of the simple netlist transformation are set forth in table 500 of FIG. 5.

$XA^+IO$: In this case, all but the 2-input XOR, AND, INV and OR gates are removed from the library. These four remaining gates are the minimum set of gates required by Synopsys Design Compiler (otherwise the synthesis tool refuses to run). As discussed above, the area of the AND gate is set to be considerably larger than the rest (e.g., as indicated by the $^+$ symbol). Consequently, Design Compiler is optimized for area (using the –area_effort high flag). After gate removal and circuit synthesis, table 500 demonstrates that there is no observable benefit in using this approach, as the results are worse than the baseline implementation. Further investigation indicates that the overall execution time in the $XA^+IO$ case is dominated by the OR gates of the synthesized circuit. The OR gate is being substituted by several operations in the FHE domain.

$XA^+IO^+$: In order to limit the effect of the OR gate to the performance of the privacy-preserving IP verification, the size of the OR gate is modified to be substantially bigger compared to the default size (arbitrarily chosen to be 10,000 times bigger). Again, the system is optimized for area in an effort to exclude as many OR gates as possible. The results are now mixed, as some circuits exhibit improved timing while others are still worse.

$XA^+IO^+N$: Finally, NANDs (i.e., negative AND gates) are included in the library. The reason behind this decision is that NAND is a universal gate, and can potentially substitute for a wide combination of AND and OR gates more efficiently. The results demonstrate a substantial improvement over the prior tests of 41.2% average performance overhead reduction. Performance improvement appears on all benchmarks.

CONCLUSION

The proposed protocol enables the IP owner to transform the design to a functionally-equivalent format that can be deployed in the homomorphic encryption domain, while the IP user can securely apply proprietary input patterns. Privacy-preserving verification can also be outsourced to a third party for increased security. The expected slowdown of the FHE application is around three orders of magnitude. To reduce the overhead, synthesis-driven optimization is introduced, which transforms the circuit to an FHE-friendly format.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of the invention might include a general purpose computing computers in the form of computers, including a processing unit 110, a system memory 120, and a system bus that couples various system components including the system memory to the processing unit. The computer-accessible medium 120 can contain executable instructions 130 thereon. In addition or alternatively, a storage arrangement 140 can be provided separately from the computer-accessible medium 120, which can provide the instructions to the processing arrangement 110 so as to configure the processing arrangement to execute certain exemplary procedures, processes and methods, as described herein, for example. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A method of verifying an intellectual property ("IP") core with test vectors in the encrypted domain between at least two parties, the at least two parties including an IP owner and an IP user, the method comprising:
   transforming, by an IP owner computing system, an IP core to a fully homomorphic encryption ("FHE") compatible netlist;
   generating, by an IP user computing system, a private encryption key and a public encryption key for a FHE scheme;
   encrypting, by the IP user computing system, a test vector with the private encryption key to form an encrypted test vector that is encrypted according to the FHE scheme;
   inputting the FHE compatible netlist, the encrypted test vector, and the public encryption key into a privacy-preserving verification ("PPV") tool;
   generating, by the PPV tool, an encrypted test output; and
   transmitting the encrypted test output to the IP user computing system.

2. The method of claim 1, further comprising decrypting, by the IP user computing system, the encrypted test output to verify the functionality of the IP core.

3. The method of claim 1, wherein generating the encrypted test output is performed without decrypting the encrypted test vector.

4. The method of claim 1, wherein transforming the IP core to the FHE compatible netlist includes a re-synthesis operation.

5. The method of claim 4, wherein the re-synthesis operation removes multiplication operations from the netlist.

6. The method of claim 1, wherein transforming the IP core to the FHE compatible netlist includes transforming any combinational logic of the IP core to XOR gates or AND gates.

7. The method of claim 1, wherein the at least two parties further includes a verification service provider, and wherein the method further includes:
   transmitting, by the IP owner computing system, the FHE compatible netlist to a verification computing system associated with the verification service provider; and
   transmitting, by the IP user computing system, the encrypted test vector to the verification computing system.

8. The method of claim 7, wherein the verification computing system includes the PPV tool.

9. The method of claim 1, further comprising transmitting, by the IP user computing system, the encrypted test vector to the IP owner computing system.

10. The method of claim 9, wherein the IP owner computing system includes the PPV tool.

11. The method of claim 1, wherein the encrypted test vector includes a random factor that provides for different encrypted representations for all zeros and ones.

12. A computer-implemented machine for verifying an intellectual property ("IP") core with test vectors in the encrypted domain between at least two parties, the at least two parties including an IP owner and an IP user, comprising:
   a processor; and
   a nontransitory computer-readable medium operatively connected to the processor and including computer code configured to:
      transform, by an IP owner computing system, an IP core to a fully homomorphic encryption ("FHE") compatible netlist;
      generate, by an IP user computing system, a private encryption key and a public encryption key for a FHE scheme;
      encrypt, by the IP user computing system, a test vector with the private encryption key to form an encrypted test vector that is encrypted according to the FHE scheme;

input the FHE compatible netlist, the encrypted test vector, and the public encryption key into a privacy-preserving verification ("PPV") tool;

generate, by the PPV tool, an encrypted test output; and transmit the encrypted test output to the IP user computing system.

13. The computer-implemented machine of claim 12, wherein the computer code is further configured to decrypt, by the IP user computing system, the encrypted test output to verify the functionality of the IP core.

14. The computer-implemented machine of claim 12, wherein generating the encrypted test output is performed without decrypting the encrypted test vector.

15. The computer-implemented machine of claim 12, wherein transforming the IP core to the FHE compatible netlist includes a re-synthesis operation.

16. The computer-implemented machine of claim 12, wherein transforming the IP core to the FHE compatible netlist includes transforming any combinational logic of the IP core to XOR gates or AND gates.

17. The computer-implemented machine of claim 12, wherein the computer code is further configured to:

transmit, by the IP owner computing system, the FHE compatible netlist to a verification computing system associated with the verification service provider; and transmit, by the IP user computing system, the encrypted test vector to the verification computing system.

18. The computer-implemented machine of claim 12, wherein the computer code is further configured to transmit, by the IP user computing system, the encrypted test vector to the IP owner computing system.

19. The computer-implemented machine of claim 12, wherein the encrypted test vector includes a random factor that provides for different encrypted representations for all zeros and ones.

* * * * *